S. CORSE.
Car-Starter.

No. 159,645.

Patented Feb. 9, 1875.

Witnesses:
Michael Ryan
Fred. Haynes

Samuel Corse
Brown & Allen

THE GRAPHIC CO, PHOTO-LITH. 39 & 41 PARK PLACE, N.Y.

UNITED STATES PATENT OFFICE.

SAMUEL CORSE, OF NEW YORK, N. Y.

IMPROVEMENT IN CAR-STARTERS.

Specification forming part of Letters Patent No. 159,645, dated February 9, 1875; application filed December 10, 1874.

*To all whom it may concern:*

Be it known that I, SAMUEL CORSE, of New York, in the county and State of New York, have invented certain Improvements in Starting-Mechanism for Cars, Trucks, and other vehicles; and I do hereby declare that the following is a full, clear, and exact description of the same, reference being had to the accompanying drawing forming a part of this specification.

My invention consists in a novel construction and arrangement of parts, whereby the driver of a car or other vehicle is enabled to impart a rotary motion to the wheels, and thereby assist the horses in starting the vehicle. The invention is applicable to wheeled vehicles in general, but is designed more especially for street-railroad cars.

Figure 1:
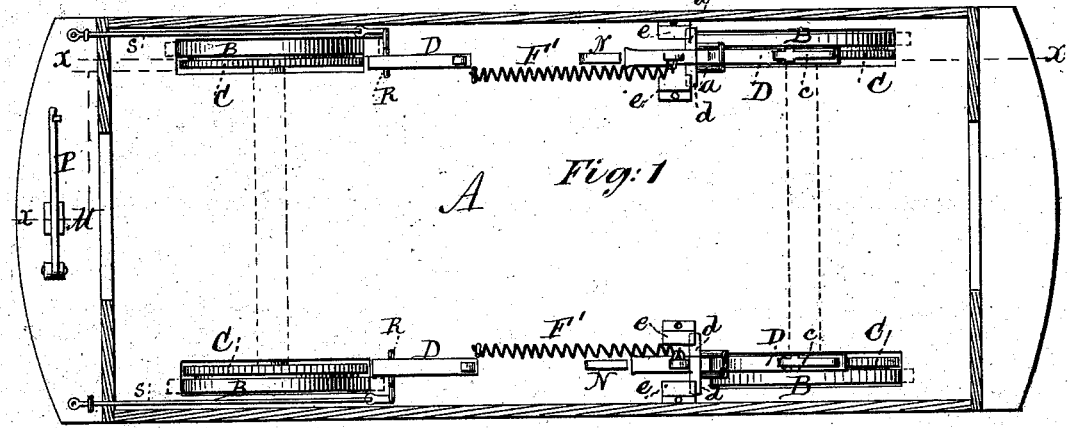
Figure 2:
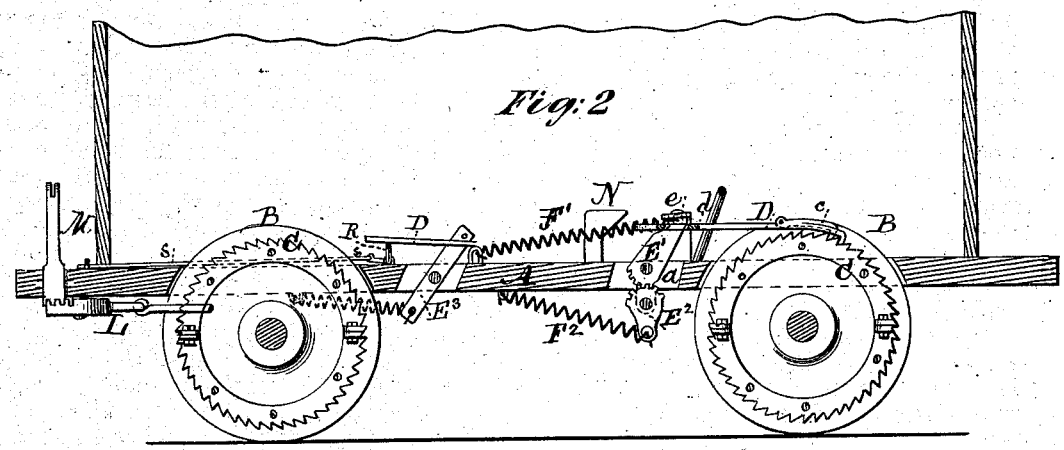
Figure 3:
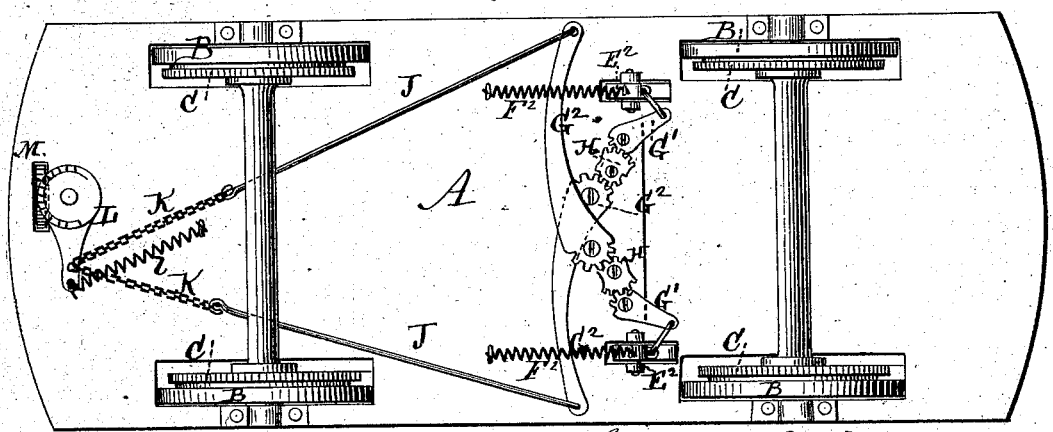

In the accompanying drawing, Figure 1 is a top view of the floor of a street-car, with my invention applied thereto. Fig. 2 is a longitudinal section of the same. Fig. 3 is a bottom view of the same.

A represents the floor of a street-car of ordinary construction, to the wheels B of which are attached ratchets C, one to each wheel. To facilitate the attachment of the ratchets, they may be made each in two semicircular halves, and secured together by bolts passing through flanges, as shown in Fig. 2. The ratchets are secured to the wheels by bolts or screws, and their peripheries are concentric with those of the wheels. The teeth of the ratchets are so arranged that those of one set run in opposite directions to those of the other set. The ratchets are attached to the wheels by preference instead of to the axles, in order that they may be covered by the seats and be out of the way of the occupants of the car. Above the floor and under the seat are a number of pawls, D, for engagement with the ratchets. Each pawl is connected near its rear end with the upper end of a lever, $E^1$, which works in a slot, $a$, in the floor of the car, the upper end of the lever passing through a slot in the pawl. To the upper end of the lever $E'$ is attached one end of a spring, $F'$, the other end of which is attached to the floor A or a projection extending upward therefrom. The lower end of the lever $E^1$ is toothed and engages with teeth on the upper end of a similar lever, $E^2$, working in the slot $a$, and having a spring, $F^2$, attached to its lower end and secured to the under side of the floor A. These springs $F^1$ $F^2$ have a tendency to pull the upper end of the lever $E^1$ and the lower end of the lever $E^2$ in a direction toward the center of the floor. On the pawl D are two lateral projections, $d\ d$, which engage with ways or guides $e\ e$ attached to the floor, in the manner hereinafter described. The pawls D may be provided with a supplementary pawl, $c$, pivoted thereto, for engagement with the ratchet in the event of failure of the pawl D to engage as desired. On the under side of the floor A is pivoted a lever, $G^1$, the long arm of which is connected by a suitable connecting-rod or link with the long arm or lower end of the lever $E^2$. The short arm of the lever $G^1$ is toothed, and engages with one of the edges of a toothed double-sector, H, which is pivoted to the under side of the floor A. The other edge of the sector is also toothed, and engages with the toothed short arm of a lever, $G^2$, of similar shape to the lever $G^1$, but longer, and pivoted in the same plane. The long arm or outer end of the lever $G^2$ has attached to it one end of a rod, J. One set of the mechanism above described, consisting of the levers $G^1$ $G^2$, double sector H, levers $E^1$ $E^2$, springs $F^1$ $F^2$, and pawl D, is applied to each wheel, and one double set is applied to each pair of wheels. The rods J are connected by a chain or chains, K, with one end of an arm, L, the other end of which is enlarged and rounded and provided with crown teeth on its upper side. The toothed end of the arm is arranged to turn on a pivot, and to the other portion is attached one end of a spring, $l$, the other end of which is attached to the floor A, and has a tendency to pull the arm back toward the center of the car. A lever, M, is pivoted in a slot in the floor A or the platform of the car, so as to oscillate in a direction transversely to the length of the car. The lower end of the lever M is toothed, and engages with the toothed portion of the arm L, and the upper end projects up above the floor or platform, and is engaged by a foot-lever, P, one end of which is pivoted to, or near, the floor or platform.

The operation of my invention is as follows: When the driver wishes to assist the horses in starting the vehicle, he presses with his foot upon the foot-lever P, which bears down the upper end of the lever M, causing its teeth to engage with those of the arm L, and turn it on its pivot, drawing the chains K and rods J forward, and, through the operation of the levers $G^2$ $G^1$, sectors H, and levers $E^2$ $E^1$, throwing the pawls D backward to the position in which they are desired to engage with the ratchets. As the pawls D move backward, the projections $d$ $d$ ride over the ways or guides $e$ $e$, and keep the pawls from engaging with the ratchets until they reach the desired positions, when they drop and engage with the ratchets, and, at the same time, the projections $d$ $d$ fall below the ways or guides $e$ $e$. When the foot-lever P is released by the driver, the springs $F^1$ $F^2$ draw levers $E^1$ $E^2$ forward, bringing forward the pawls D while they are engaged with the ratchets, and thus giving a rotary motion to the wheels, and assisting the horses in starting the car, the projections $d$ passing under the ways or guides $e$, and holding the pawls in contact with the ratchets until they reach the end of the ways or guides, when the inner ends of the pawls D strike the inclined edges of plates N, which depress said inner ends, and raise the outer ends, so that the projections $d$ will again ride over the ways $e$ when the pawls are thrown backward again to repeat the operation.

If desired, instead of the two levers $E^1$ $E^2$ a single straight lever, $E^3$, may be used, as shown in Fig. 2; but I prefer the two toothed levers, as I thereby acquire the same power with less motion.

When the invention is applied to a truck or vehicle the mechanism will be connected with only one pair of wheels; but, when applied to a car, it will be connected with both pairs, one set to be used when the car is going in one direction, and the other set when going in the opposite direction. To prevent one set from being tampered with when the other set is in use—as, for instance, by persons on the rear platform, while the driver is on the front platform—I provide a crank-shaft, R, to which is attached a cord or wire, $s$, by which means the driver is enabled to raise the crank R to an upright position under the pawl D, as shown in Fig. 2, and thus prevent the pawl from being thrown into engagement with the ratchet.

When not intentionally held up the crank will fall of its own weight; or it may be provided with a spring, to insure its being held out of the way of the pawl when not in use.

By the mechanism herein described the levers $G^1$ are moved in the same direction as if the lever $G^1$ and lever $G^2$ were in one single piece; but, by the introduction of the sectors H, I acquire greater power with less motion of the parts. The power and the motion may be varied, according to the preference of the person constructing the apparatus, by changing the fulcrums of the levers and sectors as may be found desirable.

This starting mechanism is operated entirely independent of the brakes; and may be applied to cars already in use without interfering with the brake mechanism.

What I claim as new, and desire to secure by Letters Patent, is—

1. The combination of the ratchets C, attached to the wheels B, and the pawls D, connected with the levers $E^1$, provided with the springs $F^1$, for imparting the forward motion to the wheels, as shown and described.

2. The combination of the inclined-edged plates N and the ways or guides $e$ $e$ with the pawls D, provided with the lateral projections $d$ $d$, as shown and described.

3. The combination, with the pawls D, of the levers $E^1$ $E^2$ and springs $F^1$ $F^2$, as shown and described.

4. The combination, with the levers $E^2$, of the levers $G^1$ $G^2$ and toothed double sectors H, as shown and described.

5. The combination of the levers $G^2$, rods J, chains K, and arm L, as shown and described.

6. The combination of the arm L, toothed lever M, and foot-lever P, as and for the purpose specified.

7. In combination with the pawls D, the cranks R, to operate as and for the purpose specified.

SAMUEL CORSE.

Witnesses:
 MICHAEL RYAN,
 FRED. HAYNES.